April 4, 1933.  W. NOBLE  1,903,328

HYDRAULIC VALVE GEAR

Filed April 1, 1927  2 Sheets-Sheet 2

Inventor
Warren Noble.

Patented Apr. 4, 1933

1,903,328

UNITED STATES PATENT OFFICE

WARREN NOBLE, OF DETROIT, MICHIGAN

HYDRAULIC VALVE GEAR

Application filed April 1, 1927. Serial No. 180,119.

This invention relates to the actuation of puppet valves of internal combustion engines, and contemplates the provision of positive, simple and efficient means for such operation, which will lend themselves to application in many situations of operation and under many conditions often not possible, convenient or desirable with the usual mechanical valve operating means such as are in general use.

Generally speaking, the object of the invention is to provide for the hydraulic actuation of the valves through the medium of a column of fluid, preferably oil, suitably enclosed and adapted to form a positive connection between a tappet and a valve stem so that the operation of the tappet will be communicated to the said valve stem, and vice-versa, and to further provide for the proper maintenance of the column of oil in an air-free condition ensuring the effective maintenance of the said connection between the tappet and the said valve stem.

A further object is to provide, by the adoption of hydraulic valve operating means, an extremely desirable reduction in the complexity of the timing mechanism or gearing utilized in effecting the operation of the valve actuating means; and to provide a flexibility of disposition of the valve actuating means much greater than that of mechanical valve actuating means, as distinguished from the hydraulic means now suggested, whereby the interconnecting of mechanisms without reference to the planes of interacting mechanical movements, is rendered possible, together with the maintenance of a closed system.

The simple principle of utilizing an enclosed column of liquid to transmit motion from one element to another is, of course, quite old and has been extensively suggested for different purposes and even in a number of cases in connection with the actuation of the puppet valves of internal combustion engines, but in the latter direction very little success has been met with and apparently no commercial success, probably due to the fact that many of the essentials necessary to the proper operation of such arrangement have been overlooked. Several of these essentials are set forth in a general way in the immediately ensuing paragraphs of this specification.

It is necessary in a hydraulic valve actuating mechanism that full and rapid action of the valves should be effected and that such action of the valves should not be delayed or varied in its timing or extent by pressures within the cylinder of the engine, or by other causes, and consequently it is necessary that the actuating body of oil be free of entrained air and the casing of the oil free from any accumulated air, which air would naturally provide a compressibility in the column as a whole which would reflect itself in proper valve operation; that the column of oil be replenished for leakage with every operation or cycle, or replenished to replace with oil the space occupied by entrained air which has been eliminated; that the column of oil be positively confined during the working portion of the cycle so that fully effected transmission of motion, without loss, will be ensured at such time; that the hydraulic valve actuating mechanism be made sufficiently independent of temperatures and viscosity conditions to operate in a manner uniform at high and low engine speeds and under the varying conditions of general engine operation; and that the hydraulic valve actuating device be capable of providing complete operating characteristics at cranking speeds in order that starting an engine equipped therewith may be readily effected. It is, therefore, among the objects of this invention to provide for the foregoing requirements entering into the production of a practical hydraulic valve gear.

Entrained air in a hydraulic valve actuating device will, due to its buoyancy, eventually find its way to the highest point in the oil casing, provided it is not trapped at some other point, and may be eliminated from such high point or trap by valving. Suitable design will prevent trapping of air at any other point, but, if such design is not convenient or desirable for any reason, it would then become necessary to provide for the valving of air at such trap. It is necessary that the valving provide for the escape of such air, preferably also permitting the escape of oil therethrough, and be of a non-return type preventing flow into the oil casing therethrough; and the valve must also be capable of being locked or maintained closed during such period and in such manner as to solidly confine oil in the casing after air bleeding has been accomplished and during the actual valve-operating function of the oil column. It is, therefore, an object of this invention to provide for the valving of the oil column casing in such manner and for such purpose.

In mechanical valve lifting systems, as ordinarily constructed, a slight clearance is required between the end of the valve and the lifting gear, which results in incorrect translation of the cam profile into lift, both rising and falling, of the valve tappets and is subject to variation of expansion, wear, and variations of adjustment of the engine parts associated with or entering into the valve lifting system. This condition is accentuated as the cam travel is shortened, so that the mechanical valve lifting system develops appreciable disadvantages due to clearance if utilized with a multiple lobed cam, in which the lobes extend through only small divisions of the circumference of the cam, and such clearance, although measured only in thousandths of an inch, varies the timing of a valve to a very measurable extent with a resultant power loss in the engine. It is, therefore, an object of the present invention to provide a hydraulic valve having a no-clearance valve lifting characteristic, and to provide for this characteristic by maintaining pressure on the oil of the actuating oil column during the inactive period of the operating cycle, and, still further, it is an object of the invention to provide for the maintaining of such pressure from the lubricating system of the engine, wherein sufficient pressure for the said purposes is already stored.

Still further, the invention provides for the regulation of valve acceleration and lift to desired values by relatively proportioning the area of a cam actuating plunger operating against the actuated oil column to the area of a valve stem or that part of a valve against which the said column operates, such regulation permitting of the use of a cam profile most desirable for that purpose; the actuating mechanism being adapted to the form of cam profile desired, instead of the cam profile being limited in its design by the restrictions such as are imposed on it by the mechanical valve operating gear as heretofore constructed.

The invention also has as an object to provide in a hydraulic valve gear, means for preventing overloading of the gear with oil which would otherwise build up an excessive valve lift and prevent its proper seating Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide the puppet valve of an internal combustion engine with an actuator head to the interior of which the valve stem is exposed, directly or otherwise, for actuation by fluid under pressure in said actuator head, said valve being seated, such as by a valve spring, against which spring said valve is unseated by fluid pressure in the actuator head; a complete lift pump connected by a closed conduit to said actuator head, the oil in said pump, said actuator head and the connection therebetween forming a hydraulic lifter actuating said valve under impulse from said pump; means for the replenishing of oil in said column during part of the cycle of pump operation, other than its valve actuating operation, said means including, for high speed operation, a force feed intake; and means providing for replenishment of oil under low speed conditions, together with an air bleed device situated in the actuator head at the highest point of the system for the elimination of entrained or accumulated air therefrom.

More particularly, the invention may be carried into effect by the utilizing, as an actuator, a one-way pump including an inlet valve incorporated in its plunger, said inlet valve being sensitive to atmospheric pressure to facilitate hand starting of the engine, and provided with a force feed intake to satisfy high speed conditions; a cam operated tappet member actuating said plunger against the resistance of a tappet spring, but principally against the resistance of the engine valve spring, which latter spring is adapted to take the burden of returning the plunger to an initial position after each actuating stroke; a low lift cam compensated for by a relatively differential area between the effective exposed areas of opposite ends of the oil column to the actuating and actuated means; and an over-travel release to prevent overloading of the oil column.

All of the foregoing is more particularly described and ascertained hereinafter, by way of example, having reference to the accompanying drawings, wherein:—

Figure 1:
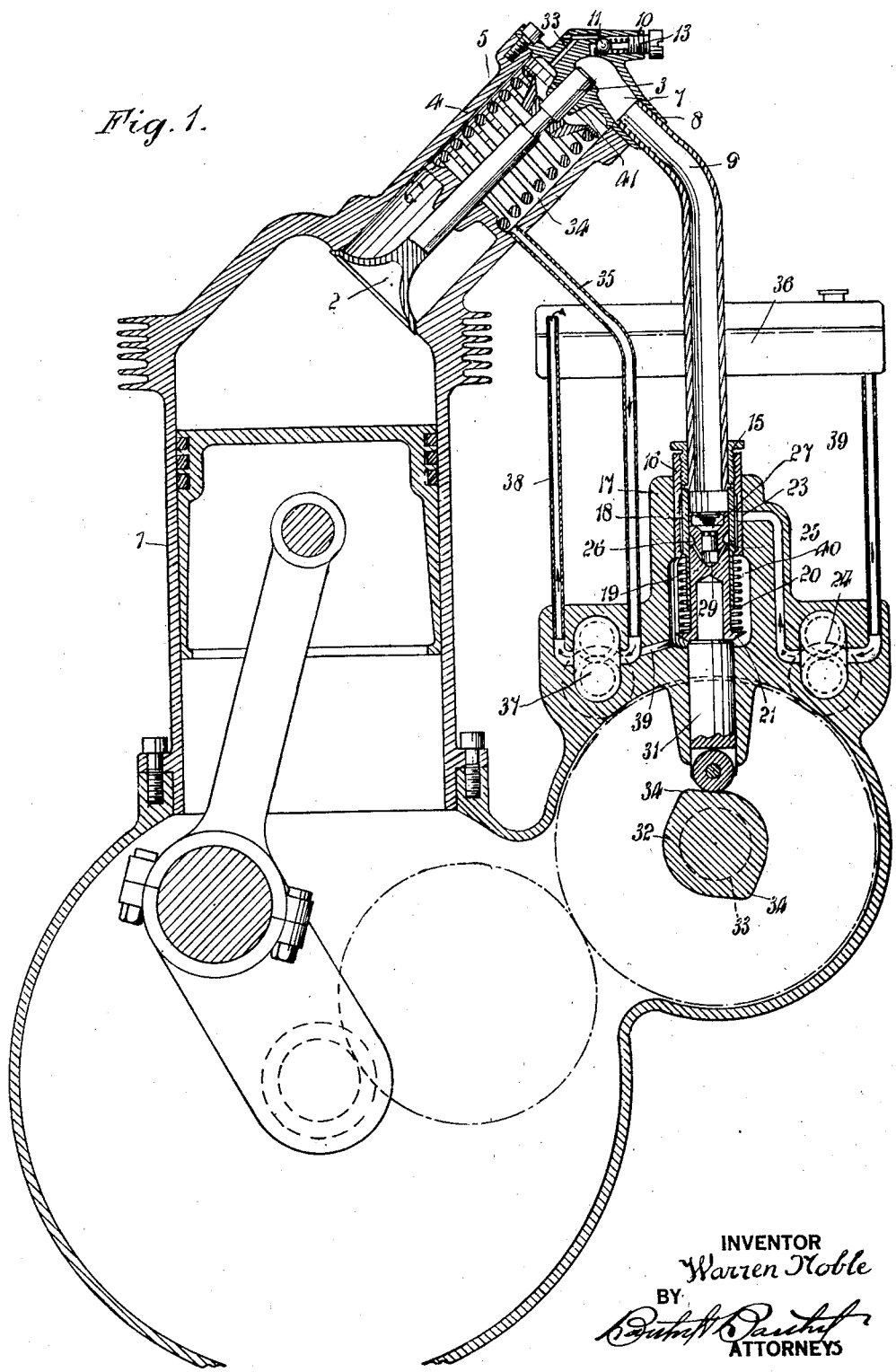
Figure 1 is a somewhat schematic transverse sectional view of an engine having applied thereto a hydraulic valve gear embodying the said invention.
Figure 4:
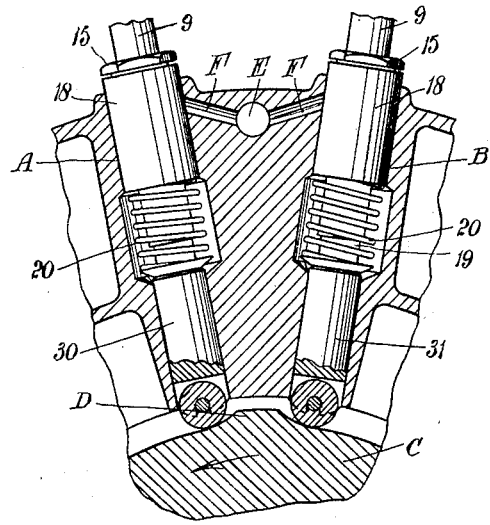
Figure 4 is a fragmentary sectional view of part of an engine illustrating a convenient arrangement of actuators.
Figure 3:
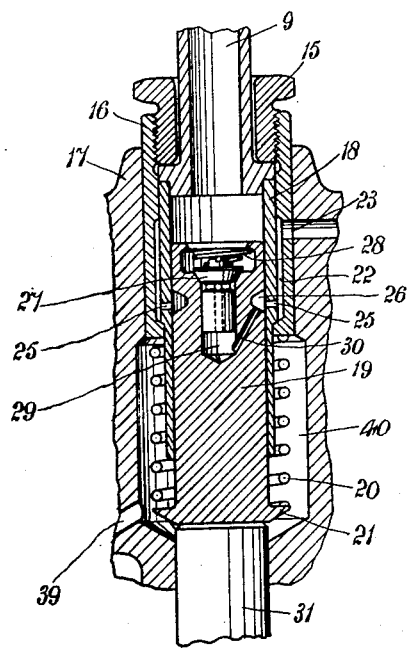
Figure 3 is a fragmentary detail sectional view of the actuator casing and actuator mechanism.
Figure 2:
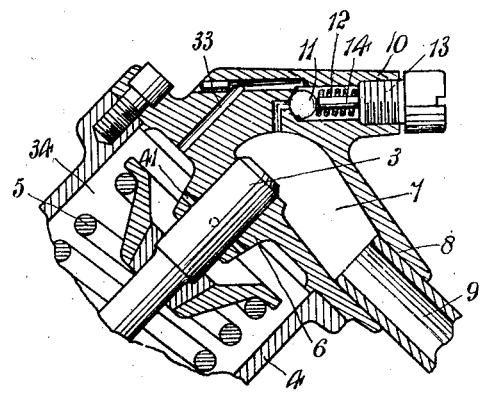
Figure 2 is a fragmentary detail sectional view of the valve casing and actuator head.

Similar characters of reference indicate similar parts in the several figures of the drawings, and Figures 2 and 3 are drawn to a larger scale than Figures 1 and 4.

In the drawings a four-cycle engine 1 is shown, more or less schematically for the purpose of illustrating an application of the invention thereto, considerable disproportion having been resorted to in order to prevent crowding of the features shown and to permit a clear showing of the mechanism of the hydraulic valve gear. 2 indicates a valve such as the exhaust valve of the engine, the stem or plunger 3 of said valve being suitably mounted for operation in a valve casing 4 which also houses a valve spring 5, against the resistance of which spring the valve is opened.

The end of the valve stem or plunger 3 passes into a tubular boss or cylinder 6 which constitutes a fluid chamber in which the said valve stem or plunger operates, this chamber being provided in the inner wall of a valve-actuator head 7 secured to the said outer end of valve casing 4, this actuator head being in the form of a chambered structure having an inlet opening 8 thereto which receives the upper end of an actuator pipe 9.

Said actuator head is also provided with an internally threaded boss 10 receiving a ball check valve 11, seated by a spring 12, 13 being a plug or cap threaded into the outer end of the said boss 10 to compress the said check valve spring 12, and also provided with an extension 14 for positively closing said check valve when said plug is screwed home in said boss. When the said plug is unscrewed to a certain extent, the said check valve is permitted to function as an outlet means from the said actuator head.

The lower end of the actuator pipe 9 is shown as being secured by a coupling 15 to the outer end of a sleeve 16 mounted in an actuator casing 17, which is illustrated as forming part of the crankcase structure of the engine; and said sleeve 16 has mounted therein an actuator cylinder or fluid chamber 18 in which an actuator plunger 19 operates. An actuator spring 20 situated between the lower end of the said sleeve and the flange 21 from the lower end of the plunger resists the upward or valve actuating stroke of the said plunger.

The inner wall of the said sleeve is recessed about the cylinder 18 to provide an annular oil chamber 22 and has an inlet port 23 through which pressure oil from a pump 24 is fed to the said chamber; and the cylinder 18 is ported at 25 from the said chamber 22 to provide communication with an annular passage 26 formed in the plunger 19 and located to register with the said port 25 when the plunger is at the bottom of its stroke.

The said plunger 19 has mounted therein a check valve 27 seated by a spring 28 to close the outlet of a chamber 29, which outlet opens through the upper end of the plunger to the interior of the cylinder 18 in advance of the plunger. 30 is a passage affording communication between the groove 26 and the said chamber 29 of the plunger.

It will be apparent that, when the plunger is at the bottom of the stroke and the said groove registers with the port 25, pressure oil may pass through to the chamber 29 and to the interior of the cylinder 18 and actuator pipe 19 provided the check valve 27 opens, as it will, in such position of the parts, if the column of oil in the cylinder actuator pipe and actuator head is not complete as in the case of any leakages having taken place, or when initially loading the system.

It will be understood that the device is operated with such a complete column of oil in the cylinder, actuator pipe and actuator head, this column of oil providing the actuating connection or valve-lifting agent in the form of a fluid operating line between the plunger 19 and the valve stem 3, and as long as the complete column of oil is maintained a true translation of movement of the said plunger into movement of the said valve stem is ensured due to the incompressible nature of the oil.

Thus, the active area of the end of the plunger 19 may be much greater than the area of the end of the valve stem against which the oil column operates and thus afford a lift of the valve correspondingly greater than the lift of the plunger, which in turn permits a softer cam for the operation of the device and also permits the use of a slow rotating cam with an increased number of lobes. Consequently, the cam travel may be only a fraction of the 90-degrees (approximately) generally called for in four-cycle internal combustion engine practice.

In the illustration the plunger 19 is operated by a tappet 31 situated without clearance between the lower end of the said plunger and the cam 32 of the camshaft 33, the said cam having two lobes 34, each of half the travel usual in connection with the usual type of mechanical valve gear. The camshaft in this case runs at quarter crankshaft speed instead of the usual half crankshaft speed with resultant advantages and easy lifting operation of the cam, which will be immediately apparent and do not need to be further dwelt on herein.

The property of air to rise to the highest point of the fluid column will, in the arrangement shown, result in any air entering the hydraulic valve gear described rising to the actuator head and accumulating therein. This condition would obtain to some considerable extent when initially charging of the system with oil, so that, before proper operation of the hydraulic valve gear could take place, elimination of such air from the system would be necessary. This may be readily accomplished by unscrewing the plug 13 sufficiently to release the check valve 11 and then cranking the engine to operate the plunger 19, which will, at the bottom of each of its strokes, admit oil to the cylinder 18 and by progressive reciprocation pump oil into the actuator pipe 19 and actuator head, by virtue of operation of the check valve 27, until the oil crowds all of the accumulated air from the actuator head past the check valve 11, whereupon excess oil will then be forced through the check valve indicating elimination of air from the actuator head. The check valve may then be positively closed against further operation by screwing down the said plug 13. In the event of further accumulation of air, such as by entraining with oil entering the system, such air may be readily eliminated from the system by again relieving the check valve temporarily in the manner described, while the engine is running.

The leakage of oil from the actuating column about the end portion of the valve stem to the interior of the valve casing or about the plunger 19 to a slight extent sufficient for lubrication of these parts, but not sufficient to materially affect the operation of the device, may take place, but such continued leakage, without provision for the replenishing of oil in the column, would eventually produce a noticeable and undesirable effect on the lifting of the engine valve. However, the provision for oil-replenishing through the check valve 30 of the plunger 19, when the said plunger is not actually performing its valve actuating or upward stroke, ensures a full charge of oil being maintained above the plunger on every actuating stroke, and a full lift being given to the engine valve on each such stroke.

As the lift of the plunger is a true translation of the lift of the cam, due to the avoidance of clearance between the tappet and the cam and the tappet and the plunger, a harmonic profile of cam produces a true harmonic actuation of the engine valve and consequent quietness and precision of operation. It will be further apparent that, as there are no tappet clearances, the variations common in operation due to heat, warpage and expansion in connection with mechanical tappets, is practically eliminated and considerable importance is attached to this feature of the device.

A hydraulic valve operating gear, such as that described, has also the advantage by being not limited as to relative situation of the actuating mechanism and the actuator head. As shown in Figure 4, the actuator mechanisms of both the inlet and exhaust valves may be arranged in a common plane transverse to the camshaft, if so desired, this being rendered possible both by the fact that there are no restrictions imposed upon their angular relation to the valves which they operate, and the further fact that restrictions on the cam profile are much less than those imposed on the cams of mechanical valve gears. In said Figure 4, the inlet valve actuator is generally indicated by the reference letter A, and the exhaust valve actuator by the reference letter B, these actuators being shown as being radially disposed relative to a cam C having a short travel lobe D. E is a pressure oil manifold from which passages F extend, F corresponding to the inlet 23 of Figure 1.

Overflow oil from the check valve 11, when it is operated, may be disposed of in any convenient manner. For example, it may be carried by a spill pipe 33' to the spring chamber 34 of the engine valve casing and from thence returned as through a pipe 35 to an oil reservoir 36 through the medium of a pump 37 and discharge pipe 38 therefrom. The inlet of this pump 37 may be also connected as by a passage 39 with a chamber 40 in the actuator casing 17 in which chamber a plunger spring 20, and the lower end of the plunger 19 are housed and lubricated by such oil as may leak between the said plunger and the wall of its cylinder.

39 is an oil line leading from the reservoir 36 to an oil feed pump 24, which will be readily understood that this oil line, or any other suitable oil line of the system outside of the enclosed oil column of the hydraulic valve gear, may be included in the lubricating system of the engine, so that in that case the lubricating system would be linked up at least so far as oil feed is concerned with the hydraulic valve gear, or with the means supplying oil to the hydraulic valve gear.

It is desirable that provision should be made to guard against overloading of the oil casing, as in the event of the engine valve sticking in its open position for any reason and failing to return to its seated position upon the return of the plunger to its rest position riding the base circle of the cam. It will be obvious that, if no such provision against overloading were made, the condition just referred to would result in an additional quantity of oil being admitted to the oil casing to compensate for the non-return of the valve stem to its rest position, so that upon the actuating stroke of the plunger an additional movement of the valve stem outwardly of the valve casing would take place, and this would eventually push the stem entirely out of its mounting, or at least result in the valve operating in an abnormal manner. Consequently, I have shown the boss 6 of the actuator head in which the end portion of the stem reciprocates as being provided with an overload release port 41, normally closed by the said stem and so seated that movement of the stem beyond its normal stroke will cause its extremity to pass beyond and thereby open the said overload release port 41. Therefore, if the valve should stick on its return stroke so that it does not seat by, say, one-eighth of an inch, then, after recharging with oil of the valve casing upon the plunger reaching its rest position as heretofore described, a subsequent actuation of the plunger would tend to move the valve one-eighth of an inch beyond its normal lift, but this would result in the opening of the overload relief port 41 and the consequent discharge therethrough of the excess oil, thereby preventing such damage as might possibly take place by continued abnormal movement of the valve due to overloading of the casing with oil were such provision for relief not made.

From the foregoing description, it will be understood that the term "closed", as applied to the oil casing, refers to the condition existing during plunger actuation when escape of oil from the chamber is cut off to prevent lost motion in the moving parts, and does not refer to conditions existing when the plunger is at rest, riding the base circle of the cam, during which time the oil casing may be open to flow therethrough as heretofore explained.

The invention admits embodiment of a considerable variety of designs of valve actuator head, actuator mechanism, air bleed device, oil replenishing, valves, oil supply means, and it may be developed within the scope of the following claims without departing from the essential features of the said invention, and it is desired that the specification and drawings be read as being merely illustrative and not in a limiting sense, except as necessitated by the prior art.

What I claim is:—

1. In combination with a puppet valve, valve-closing means, valve actuating means comprising a closed hydraulic fluid casing to the interior of which the stem of said valve is exposed, timed mechanism imposing impulses on fluid in casing whereby said valve is actuated, a source of fluid pressure supply having a communicating passage to said casing, means closing said passage during activity of said valve, a non return relief valve opening from a region of air accumulation in said casing, and means for closing said relief valve.

2. In combination with a puppet valve, valve-closing means, valve actuating means comprising a closed hydraulic fluid casing to the interior of which the stem of said valve is exposed, timed mechanism including a plunger imposing impulses on fluid in said casing whereby said valve is actuated, a source of fluid pressure supply having a communicating passage with said casing, said plunger closing said passage during its valve actuating movement, a non return relief valve opening from a region of air accumulation in said casing, and means for closing said relief valve.

3. In combination with a puppet valve,— valve-closing means,—a spring housing, valve actuating means comprising a closed hydraulic fluid casing to the interior of which the stem of said valve is exposed, timed mechanism imposing impulses on fluid in said casing whereby said valve is actuated, a source of fluid pressure supply, non-return means opening from said source of fluid supply to said casing, an air relief valve opening from said casing to said spring housing, means for closing said relief valve when its operation is not desired, and a passageway from said housing to said source of fluid supply.

4. In combination with a puppet valve, valve closing means, a lift pump, a casing enclosing a column of hydraulic fluid between said pump and the stem of said puppet valve whereby the operation of said pump is communicated to said valve, pressure means for automatically replenishing fluid in said column between valve-actuating operations of said pump, a non return bleed valve opening from a point of air accumulation in said casing, and means for positively closing said air bleed valve.

5. In combination, a mechanically-operated plunger, a fluid chamber in which said plunger operates, a valve-operating plunger, a second fluid chamber in which the last named plunger operates, a fluid operating line connecting said chambers, and means for automatically supplying fluid to said operating line comprising a fluid supply conduit connected to an outside source, said mechanically-operated plunger having a fluid chamber adapted to communicate with said fluid supply conduit, and means to periodically interconnect said plunger chamber to said fluid operating line including a one-way valve carried by the plunger.

6. In combination, a mechanically-operated plunger, a fluid chamber in which said plunger operates, a valve-operating plunger, a second fluid chamber in which the last named plunger operates, a fluid operating line connecting said chambers, and means for automatically supplying fluid to said operating line comprising a fluid supply conduit connected to an outside source, said mechanically operated plunger having a fluid chamber adapted to communicate with said fluid supply conduit, means to periodically interconnect said plunger chamber to said fluid operating line, and means to periodically interconnect said fluid supply conduit to said plunger chamber.

7. In combination, a mechanically-operated plunger, a fluid chamber in which said plunger operates, a valve-operating plunger, a second fluid chamber in which the last named plunger operates, a fluid operating line connecting said chambers, and means for automatically supplying fluid to said operating line comprising a fluid supply conduit connected to an outside source, said mechanically-operated plunger having a fluid chamber adapted to communicate with said fluid supply conduit, means to periodically interconnect said plunger chamber to said fluid operating line, and means to periodically interconnect said fluid supply conduit to said plunger chamber at periods between succeeding valve actuations.

8. In combination, a mechanically-operated plunger, a fluid chamber in which said plunger operates, a valve-operating plunger, a second fluid chamber in which the last named plunger operates, a fluid operating line connecting said chambers and having a point of air accumulation, a bleed port for said operating line at said point of air accumulation, and a non-return valve controlling said bleed port.

9. In combination, a mechanically-operated plunger, a fluid chamber in which said plunger operates, a valve-operating plunger, a second fluid chamber in which the last named plunger operates, a fluid operating line connecting said chambers, and having a point of air accumulation, a bleed port for said operating line at said point of air accumulation, a non-return valve controlling said bleed port, and manually operable means to hold said non-return valve closed.

10. In combination with a puppet valve, valve actuating means comprising a closed hydraulic fluid operating line to the interior of which the stem of said valve is exposed, timed mechanism imposing impulses on fluid in said fluid operating line whereby said valve is actuated, a source of fluid supply having communicating supply passage to said fluid operating line, means for positively closing said passage during the activity of said valve, a check valve preventing return flow of fluid from said fluid operating line through said supply passage when the latter is open, and valve closing means, said timed mechanism including a plunger through which the impulses are imposed on said fluid, said plunger effecting the positive closing of said passage during its valve actuating movement, and being ported for the passage therethrough of fluid from said communicating passage to said casing during inactive periods of said plunger.

11. In combination with a puppet valve, valve actuating means according to claim 10 wherein said check valve is carried by and operates to prevent return flow through said plunger from said casing to said passage.

12. In combination with a puppet valve, valve actuating means including a closed hydraulic fluid casing to the interior of which the stem of said valve is exposed, timed mechanism imposing impulses on fluid in said casing whereby said valve is actuated, non-return means supplying hydraulic fluid to said casing, a relief valve opening from a region of air accumulation in said casing, and suction means inducing flow through said relief valve from said casing.

13. In combination with a puppet valve, valve closing means, valve actuating means comprising a closed hydraulic fluid casing to the interior of which the stem of said valve is exposed, timed mechanism including a plunger imposing impulses on fluid in said casing whereby said valve is actuated, a source of fluid supply having a communicating passage with said casing, said plunger closing said passage during its valve actuating movement, a relief valve opening from a region of air accumulation in said casing, and suction means inducing flow through said relief valve from said casing.

14. In combination with a puppet valve, valve closing means, valve actuating means comprising a closed hydraulic fluid casing to the interior of which the stem of said valve is exposed, timed mechanism including a plunger imposing impulses on fluid in said casing whereby said valve is actuated, a source of fluid pressure supply having a communicating passage with said casing, said plunger closing said passage during its valve actuating movement, a relief valve opening from a region of air accumulation in said casing, and suction means inducing flow through said relief valve from said casing.

15. In combination, in a hydraulic valve system subjected to pulsating pressure, a fluid chamber having an inlet and an outlet port, an actuating and an actuated plunger exposed to the fluid in said chamber, one of said ports being covered and uncovered by one of said plungers, and a pressure sensitive valve carried by said plunger for cooperation with said port whereby fluid past said port may be instantaneously checked upon rise in pressure within said system.

16. In combination, a fluid chamber having an inlet and an outlet port, an actuating and an actuated plunger exposed to the fluid in said chamber, one of said plungers being adapted to cover and uncover said inlet port under impulse, and a pressure sensitive valve carried by said last named plunger for arresting flow of fluid past said inlet port upon actuation of said actuating plunger.

17. In combination with a puppet valve, valve closing means, valve actuating means comprising a closed hydraulic fluid casing to the interior of which the stem of said valve is exposed, timed mechanism including a plunger imposing impulses on fluid in said casing whereby said valve is actuated, a source of fluid pressure supply having a communicating passage with said casing, said plunger closing said casing during its valve actuating movement, said plunger being ported for fluid supply cooperation with said passage during its periods of inactivity, a check valve carried by said plunger and a seating therein to prevent return flow from said casing through said plunger to said passage, and a relief valve opening from the interior of said casing.

In testimony whereof I affix my signature.

WARREN NOBLE.